United States Patent
Sanchez (10) Patent No.: US 10,545,028 B1
(45) Date of Patent: Jan. 28, 2020

(54) SYSTEM AND METHOD OF GENERATING ROUTE-BASED AD NETWORKS

(71) Applicant: BLUEOWL, LLC, San Francisco, CA (US)

(72) Inventor: Kenneth J. Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 215 days.

(21) Appl. No.: 15/713,560

(22) Filed: Sep. 22, 2017

(51) Int. Cl.
  *G01C 21/00* (2006.01)
  *G01C 21/26* (2006.01)
  *G01C 21/36* (2006.01)

(52) U.S. Cl.
  CPC ..... *G01C 21/3617* (2013.01); *G01C 21/3614* (2013.01); *G01C 21/3679* (2013.01)

(58) Field of Classification Search
  CPC ............ G01C 21/3476; G01C 21/3611; G01C 21/3614; G01C 21/3617; G01C 21/3679; G01C 21/3682
  See application file for complete search history.

(56) References Cited

U.S. PATENT DOCUMENTS

| | | | | |
|---|---|---|---|---|
| 8,239,130 B1* | 8/2012 | Upstill | ............... | G01C 21/3679 701/400 |
| 8,433,512 B1* | 4/2013 | Lopatenko | ......... | G01C 21/3679 701/400 |
| 8,566,029 B1* | 10/2013 | Lopatenko | ........... | G08G 1/0962 701/426 |
| 9,710,873 B1* | 7/2017 | Hill | ......................... | G06T 1/20 |
| 9,911,400 B2* | 3/2018 | Blumenberg | ........ | G01C 21/367 |
| 2011/0218992 A1* | 9/2011 | Waldman | ........... | G01C 21/3617 707/724 |
| 2016/0116292 A1* | 4/2016 | An | ........................ | G01C 21/26 701/454 |

* cited by examiner

*Primary Examiner* — Anshul Sood
(74) *Attorney, Agent, or Firm* — Faegre Baker Daniels LLP (57) ABSTRACT

A point of interest (POI) may be recommended for a mobile device user based on habits and routines of the user. By automatically and periodically capturing and analyzing location data associated with a mobile device of the user, a route traveled by the user and a plurality of POIs visited by the user may be identified. A user preference score may be generated for each POI indicating a user's preference for visiting that POI. The user preference score may be generated based on the number or frequency of visits by the user to each POI and the distance traveled by the user to visit each POI. Based on user preference scores associated with similar users, user preference scores may be predicted for POIs not visited by the user, and a POI not yet visited by the user may be recommended based on the predicted user preference score of the POI.

14 Claims, 2 Drawing Sheets

SYSTEM AND METHOD OF GENERATING ROUTE-BASED AD NETWORKS

TECHNICAL FIELD

The present disclosure generally relates to technology for recommending points of interest (POIs) to a mobile device user.

BACKGROUND

An individual may be interested in receiving recommendations for new points of interest (POIs) to visit, outside of POIs that the individual has already visited. Typical recommendation systems (e.g., advertisements) may be broadly focused and may not take an individual's preferences into account before making a recommendation to that individual. Moreover, even recommendation systems that take an individual's preferences into account may make recommendations for POIs that the individual has already visited.

SUMMARY

In one aspect, a computer-implemented method in a mobile device for recommending points of interest (POIs) to a mobile device user is provided. The method may include steps of automatically and periodically capturing location data indicating a current position of a mobile device associated with a user, recording a log of the location data captured over a period of time and analyzing the log of the location data to identify: (i) a route traveled by the user and (ii) a plurality of points of interest (POIs) visited by the user. Additionally, the method may include generating a user preference score for each POI visited by the user based at least on: (i) a number of visits by the user to each POI and (ii) a distance traveled by the user to visit each POI. Furthermore, the method may include predicting a user preference score for each POI not visited by the user based at least on one or more other user preference scores generated for the POI, the one or more other user preference scores associated with other similar users, and recommending a POI for the user based at least on the predicted user preference score of the POI.

In another aspect, an electronic device for recommending points of interest (POIs) to a mobile device user is provided. The electronic device may include a memory configured to store non-transitory computer executable instructions and a processor configured to interface with the memory, and configured to execute the non-transitory computer executable instructions. The non-transitory computer executable instructions may cause the processor to automatically and periodically capture location data indicating a current position of the electronic device, the electronic device being associated with a user, record a log of the location data captured over a period of time, and analyze the log of the location data to identify: (i) a route traveled by the user and (ii) a plurality of points of interest (POIs) visited by the user. Additionally the non-transitory computer executable instructions may cause the processor to generate a user preference score for each POI visited by the user, the user preference score being based at least on: (i) a number of visits by the user to each POI and (ii) a distance traveled by the user to visit each POI. Furthermore, the non-transitory computer executable instructions may cause the processor to predict a user preference score for each POI not visited by the user, the predicted user preference score being based at least on one or more other user preference scores generated for the POI, the one or more other user preference scores associated with other similar users, and recommend a POI for the user based at least on the predicted user preference score of the POI.

DETAILED DESCRIPTION OF THE DRAWINGS

The present embodiments may relate to, inter alia, technology for recommending points of interest (POIs) for a mobile device user to visit. A user may be interested in receiving recommendations for a new POI to visit, such as, e.g., a café that the user has never visited. It may be particularly desirable to receive a recommendation for a POI that is conveniently located, e.g., close to a route that the user already travels, or close to the current location of the user. Accordingly, such a recommendation may be provided based on the routines and habits of the user. In particular, location data associated with the user's mobile device may be analyzed to identify POIs that the user has already visited and routes that the user typically travels. Based on factors such as the number and/or frequency of visits to particular POIs, and the distances traveled by the user to reach the POIs, a user preference score may be generated for each POI visited by the user, indicating the extent to which the user prefers visiting that POI as compared to other POIs. Using these user preference scores, other similar users having similar user preference scores for one or more of the POIs visited by the user may be identified. The similar users' user preference scores for one or more POIs unvisited by the user may then be used to predict a user preference score for each of the POIs unvisited by the user. Accordingly, one or more unvisited POIs may be recommended to the user based on the predicted user preference scores for the unvisited POIs and based on the proximity of the unvisited POIs to the user's current location or to routes frequently traveled by the user. Upon noticing the recommendation, the user may discover and subsequently visit a new, conveniently located POI that suits the user's interests and preferences.

The systems and methods provided herein therefore offer numerous benefits. In particular, the systems and methods effectively and efficiently recommend POIs for a user based on based on the routines, habits, and current location of the user, as indicated by location data associated with a mobile device of the user. Using conventional methods, POIs may be recommended for a user based on user demographics or based on user-provided information, such as user surveys or social media profiles. However, user demographic information may not always be accurate for the circumstances of a particular user. For instance, a user who is of college age but not attending college may receive unhelpful recommendations based on the assumption that the user is a college student. As another example, a user who lives in one state but in vacation in another state may receive recommendations for POIs in his or her home state but not in his or her current location. Additionally, even user-provided information from a particular user may be inaccurate for a variety of reasons. For instance, user-provided information may be incomplete due to a lack of time or interest in providing such information on the part of the user. As another example, a user may forget visited POIs, or otherwise under- or overestimate how often he or she visits certain POIs. Moreover, user-provided information may not always include information related to a user's lack of interest in certain POIs, or related to the extent of a user's preference for certain other POIs. Furthermore, POI recommendations based on either user demographic information or user-provided information may include unhelpful recommendations for POIs already visited by the user.

The systems and methods provided herein offer improved capabilities to solve these problems by automatically and periodically capturing location data associated with the user in order to identify POIs visited by the user, routes traveled by the user, and the current location of the user, and generate user preference scores indicating the extent to which the user prefers each POI. Accordingly, the location data captured by the mobile device and user preference scores derived therefrom will likely more precisely reflect the actual habits and preferences of the user than either user demographic information or user-provided information. Moreover, because POIs visited by the user may be identified by analyzing the location data, it is unlikely that the systems and methods provided herein will generate a recommendation for a POI the user has already visited.

Because the systems and methods described herein employ the collection and analysis of data, the systems and methods are necessarily rooted in computer technology in order to overcome the noted shortcomings that specifically arise in the realm of user preference data collection. According to implementations, the systems and methods may support a dynamic, real-time or near-real-time analysis of any captured, received, and/or detected data. In particular, POIs may be recommended for a user based on the captured current location of the user. In this regard, any user who receives a recommendation for a nearby POI is afforded the benefit of accurate and relevant data, and may, for instance, visit the recommended POI while still in the captured location.

Figure 1:
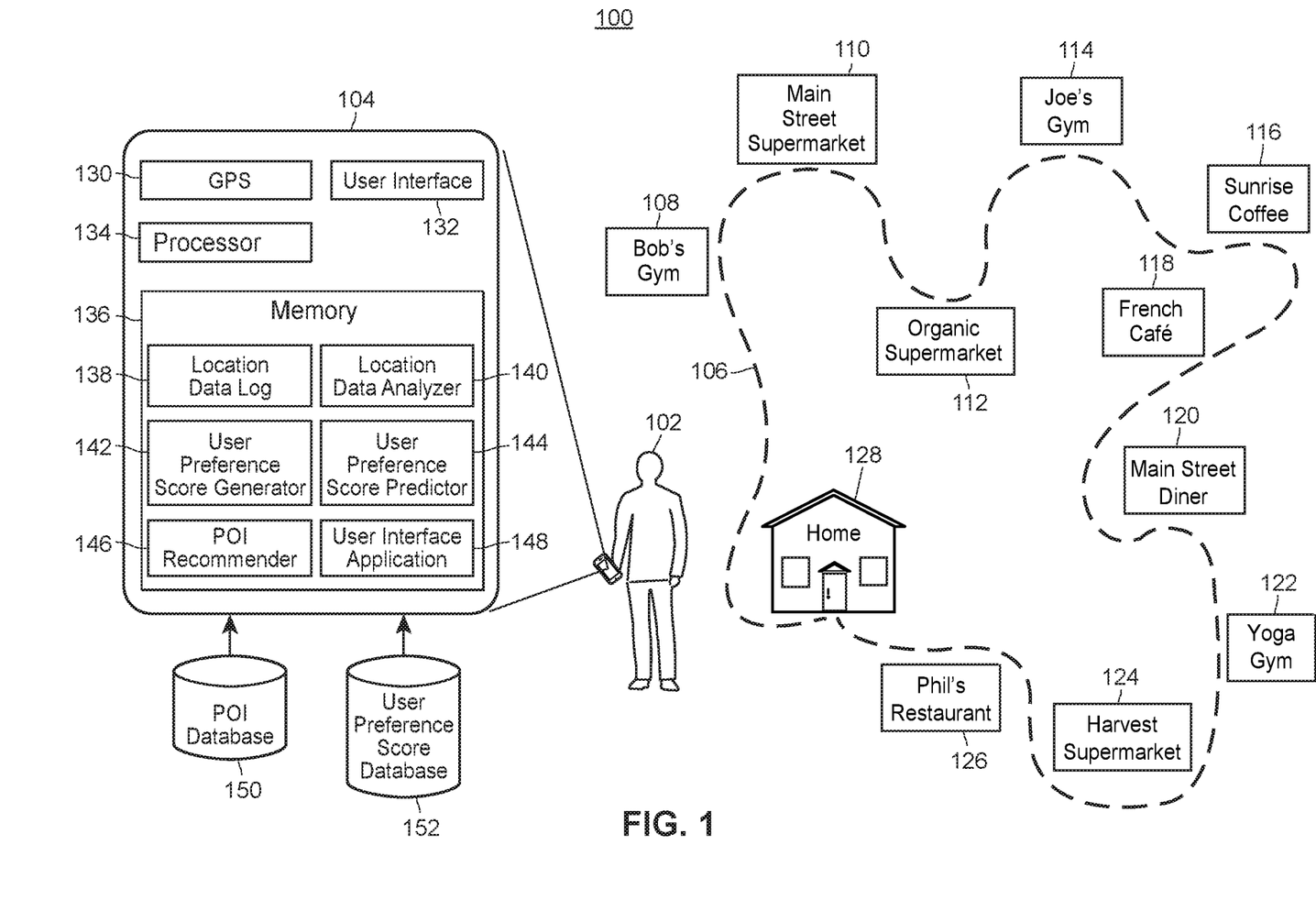
FIG. 1 depicts a block diagram of an exemplary system for recommending points of interest (POIs) to a mobile device user.

FIG. 1 depicts an exemplary system 100 for recommending points of interest (POIs) to a mobile device user. A user 102, with whom a mobile device 104 may be associated, may travel various routes such as route 106. Various POIs 108-126 may exist along the route 106. The POIs may include, for instance, gyms, supermarkets, cafes, restaurants, etc. In some embodiments, the POIs may also include events, such as concerts, festivals, sporting events, conferences, plays, musicals, etc. Additionally, a given route 106 may include a "home base" 128 that forms the start and end point of route 106. The home base 128 may be, for instance, a home, workplace, or school, from which the user 102 may travel various routes 106. The mobile device 104 may include a GPS unit 130, a user interface 132, a processor 134, and a memory 136. The memory 136 may additionally include a location data log 138, as well as various applications such as a location data analyzer 140, a user preference score generator 142, a user preference score predictor 144, a POI recommender 146, and/or a user interface application 148. Moreover, the mobile device 104 may access a POI database 150 and/or a user preference score database 152.

In various configurations, the mobile device 104 may be a smart phone, a smart watch or other wearable device, a dedicated mobile device for recommending POIs, or any other suitable mobile device. In some embodiments, the user 102 may carry the mobile device 104 or otherwise keep the mobile device 104 on his or her person. In additional or alternative embodiments, the mobile device 104 may be attached to or otherwise temporarily or permanently disposed at a vehicle (not shown) operated by the user 102. The vehicle may be any type of vehicle, including an automobile, motorcycle, snowmobile, ATV, jet-ski, boat, or any other type of vehicle associated with the user 102.

Accordingly, the user 102 may travel along the route 106 via any means of transportation, including walking, running, bicycling, operating a vehicle (not shown) as discussed above, via a combination of the foregoing means of transportation, or via any other suitable means of transportation. The route 106 may be a round trip route from the home base location 128 to one or more POI and back to the home base location 128. In some instances, the route 106 may be a one way route from one POI to another POI. Of course, the user may travel more than one route 106. In some instances, one or more route 106 may be a frequently traveled route, such as a daily, weekly, or monthly route. Additionally or alternatively, one or more route 106 may be a route traveled only once, such as a route to a vacation destination.

While traveling along the route 106, the user 102 may stop and visit one or more POIs 108-126 located proximate to the route 106. Of course, the user 102 may also pass by one or more POIs 108-126 without visiting. The POIs 108-126 may include various businesses and other attractions. For instance, as shown in FIG. 1, the POIs 108-126 include two gyms 108 and 114, three supermarkets 110, 112, and 124, two cafes 116 and 118, and two restaurants 120, 126. Of course, the POIs may include other kinds of businesses such as malls, retail stores, movie theaters, or any other type of business. Moreover, the POIs may further include attractions such as museums, national and state parks, landmarks, zoos, aquariums, etc. In some embodiments, the POIs may also include events, such as, e.g., concerts, festivals, sporting events, conferences, plays, musicals, etc. In some configurations, the POIs 108-126 may be categorized by type of POI. For instance, Bob's Gym 108, Joe's Gym 114, and Yoga Gym 122 may all be categorized as Gyms, while Main Street Supermarket 110, Organic Supermarket 112, and Harvest Supermarket 124 may all be categorized as Supermarkets. Similarly, Sunrise Coffee 116 and French Café 118 may be categorized as cafes, and Main Street Diner 120 and Phil's Restaurant 126 may be categorized as restaurants. Of course, additional or alternative POI categories may be envisioned, including more specific sub-categories (e.g., cycling gyms and yoga gyms might be sub-categories of the gym category).

As discussed above, a GPS unit 130 may be disposed at the mobile device 104 and may be configured to automatically capture location data indicative of the position of the mobile device 104 (i.e., by proxy, the position of the user 102). For instance, the GPS unit 130 may be configured to capture location data continuously or periodically (e.g., every ten seconds, every minute, every five minutes, etc.) as the user travels along the route 106. Additionally or alternatively, in some embodiments, other means of capturing location data, e.g., other than a GPS unit 130, may be implemented. The mobile device 104 may record the location data in the location data log 138 of the memory 136.

The processor 134, which may be one or more processors 134, disposed at the mobile device 104, may be configured to execute various applications 140-148 stored on the memory 136 (which may in some embodiments be multiple memories 136). For instance, the applications 140-148 stored on the memory 136 may include a location data analyzer 140 application configured to analyze the location data to identify, e.g., one or more routes 106 traveled by the user 102, one or more POIs 108-126 visited by the user 102, one or more distances traveled between POIs 108-126, and/or one or more distances traveled between the user's home location 128 and any one of the POIs 108-126. As an example, the location data analyzer 140 may identify instances of changing GPS coordinates of the mobile device 104 over time, which instances may indicate that the user 102 may be traveling. Accordingly, the location data analyzer 140 may identify a route 106 based on a change in the location of the mobile device 104. In some configurations, the route 106 may be a route from a home base location 128 to a POI (such as, e.g., Bob's Gym 108) and back. In other embodiments, the route 106 may be a route from the home base location 128 to to a series of POIs (such as POIs 108-126), and then back to the home base location 128. In still other embodiments, the route 106 may be a route from one POI (such as, e.g., Organic Supermarket 112) to another POI (such as, e.g., French Café 118).

Furthermore, the location data analyzer 140 may identify one or more POIs visited by the user 102 by comparing the locations of known POIs (e.g., as determined by accessing a POI database 150) to locations where the mobile device 104 remains for a certain period of time, e.g., indicating a "stop." That is, the location data analyzer 140 may determine that a stop has been made when the captured location data stored in the log 138 indicates little to no change in the position of the mobile device 104 for a time period greater than a threshold period, such as, e.g., ten minutes. If the position of the mobile device 104 is consistent with the position of a known POI, the location data analyzer 140 may identify the POI as a visited POI. Moreover, the location data analyzer 140 may additionally calculate a distance between the home base location 128 and each visited POI by comparing the coordinates captured by the GPS unit 130 for the home base location 128 to each visited POI. Additionally or alternatively, the location data analyzer 140 may also calculate a distance between each visited POI in a similar manner.

The applications stored on the memory 136 may additionally include a user preference score generator 142 configured to generate a user preference score for each POI visited by the user 102. The user preference score generator 142 may generate the user preference score for a particular POI be based on a variety of factors, including, for instance, the number of visits by the user 102 to the POI, the frequency of visits by the user 102 to the POI, the distance traveled by the user 102 to visit the POI (e.g., from a home base location 128, or from a previous POI), the amount of time spent by the user 102 at the POI, the proximity of the POI to frequently traveled routes, etc. For course, any other suitable factors related to the preference of a user 102 for a particular POI may be used by the user preference score generator 142 in various embodiments.

In some embodiments, the user preference score generator 142 may generate a higher user preference score for a particular POI based on a higher number or greater frequency of visits to the POI. That is, if a user 102 visits a certain POI frequently, this may indicate that the user 102 prefers that POI, because the user 102 continues to return. For example, if the user 102 visits Harvest Supermarket 124 every week, the user 102 may have a preference for Harvest Supermarket 124. In additional or alternative embodiments, the user preference score generator 142 may generate a higher user preference score for a particular POI based on a greater distance traveled by the user 102 to visit the POI, e.g., as determined by the location data analyzer 140. That is, if a user 102 travels a great distance to reach a certain POI, this may indicate that the user 102 has a preference for that POI because the user 102 is willing to travel to an inconvenient location to visit the POI. For example, if user 102 travels to Sunrise Coffee 116, which may be, e.g., ten miles away from the home base location 128, the user 102 may have a preference for Sunrise Coffee 116.

Additionally, the user preference score generator 142 may generate a lower user preference score for a particular POI based on user activity indicating a lack of preference for the POI. For instance, if a user visits a POI once but never returns, this may in some instances indicate a lack of preference for the POI. As an example, if the user visits Main Street Supermarket 110 once, and fails to return, this may indicate a lack of preference for Main Street Supermarket 110.

Moreover, the user preference score generator 142 may generate user preference scores for the various visited POIs comparatively. For instance, if the user 102 visits French Café 118 three times per month, but visits Yoga Gym 122 ten times per month, the user preference score generator 142 may generate a higher user preference score for Yoga Gym 122 than for French Café 118. Additionally or alternatively, the user preference score generator 142 may generate user preference scores comparatively within particular POI categories. For instance, if the user 102 visits Main Street Supermarket 110 twice per week but visits Organic Supermarket 112 once per month, the user preference score generator 142 may generate a higher user preference score for Main Street Supermarket 110 than for Organic Supermarket 112 for the user 102, indicating that Main Street Supermarket 110 is likely the preferred supermarket for the user 102 compared to Organic Supermarket 112. As another example, if the user 102 visits Joe's Gym 114 frequently but Bob's Gym 108 infrequently, even when Joe's Gym 114 is further away from the home base location 128 than Bob's Gym 108, the user preference score generator 142 may generate a higher user preference score for Joe's Gym 114 than Bob's Gym 108, indicating that Joe's Gym 114 is likely the preferred gym for the user 102, compared with Bob's Gym 108. In particular, because the user 102 may actually travel past Bob's Gym 108 to reach Joe's Gym 114 when traveling the route 106, the user preference score generator 142 may generate a much higher user preference score for Joe's Gym 114 than Bob's Gym 108. Of course, additional or alternative ways for the user preference score generator 142 to generate the user preference score may be envisioned in additional or alternative embodiments.

The memory 136 may further store a user preference score predictor application 144 configured to predict a user preference score for POIs not visited by the user 102. The user preference score predictor 144 may, for example, predict a user preference score for a particular POI that the user 102 has not yet visited using on other similar users' user preference scores for the POI. That is, the user preference score predictor 144 may access a user preference score database 152, which may include user profiles for other users. The user profiles may include the other users' user preference scores for each POI each other user has visited. By analyzing the user profiles in the user preference score database, the user preference score predictor 144 may identify users that are similar to the user 102, and may generate predicted user preference scores for POIs unvisited by the user 102 based on the other similar users' user preference scores for those POIs.

For example, user 102 may have a high user preference score for both Organic Supermarket 112 and French Café 118, as determined by the user preference score generator 142. A high user preference score may be, e.g., a user preference score above a certain user preference score threshold. The user preference score predictor 144 may identify other similar users, i.e., other users having high user preference scores for one or both of Organic Supermarket 112 and French Café 118. Using the profiles for these other similar users, the user preference score predictor 144 may further identify POIs unvisited by the user 102 for which the other similar users have high user preference scores. For instance, the other similar users having high user preference scores for Organic Supermarket 112 and/or French Café 118 may additionally have high user preference scores for Yoga Gym 122 and Phil's Restaurant 126. Accordingly, the user preference score predictor 144 may generate a predicted high user preference score for Yoga Gym 122 and/or Phil's Restaurant 126 for user 102. Moreover, as another example, the other similar users having high user preference scores for Organic Supermarket 112 and/or French Café 118 may additionally have low user preference scores for Bob's Gym 108 and Sunrise Coffee 116. Accordingly, the user preference score predictor 144 may generate a predicted low user preference score for Bob's Gym 108 and/or Sunrise Coffee 116 for the user 102.

In some instances, the user preference score predictor 144 may, for instance, predict the user preference score for the unvisited POI by calculating an average of the other similar users' user preference scores for the unvisited POI. Additionally or alternatively, the user preference score predictor 144 may calculate a weighted average of the other similar users' user preference scores for the unvisited POI, e.g., weighting the other similar users based on how similar they are to the user 102. For example, other similar users may be more similar to the user 102 when they have more visited POIs in common with the user 102.

In some examples, the user preference score predictor 144 may additionally or alternatively base the predicted user preference score for the unvisited POI on actions by the user. For instance, if a user 102 routinely passes a POI on his or her route 106 to another POI in the same category (e.g., if the user 102 routinely travels past Bob's Gym 108 to visit Joe's Gym 114 on route 106), this may indicate that the user 102 has a lack of preference for Bob's Gym 108. Accordingly, the user preference score predictor 144 may generate a lower predicted user preference score for Bob's Gym 108. Of course, other ways for the user preference score predictor 144 to predict user preference scores for unvisited POIs may be envisioned in additional or alternative embodiments.

Additionally, the applications stored on the memory 136 may include a POI recommender application 146 configured to recommend a POI for the user 102 to visit based on the predicted user preference scores for each unvisited POI. That is, the POI recommender application 146 may identify unvisited POIs with high predicted user preference scores for the user 102 and may recommend one or more of the unvisited POIs for the user to visit. In some configurations, the recommendation may additionally be based on the proximity of the unvisited POI to one or more routes 106 traveled by the user 102, or to the home base 128 of the user 102. Additionally or alternatively, the recommendation may be based on the proximity of the unvisited POI to the current location of the user 102, e.g., as determined by the GPS 130. For example, if, as in the example above, the user 102 has a high predicted user preference score for both Yoga Gym 122 and Phil's Restaurant 126, the POI recommender application 146 may recommend Phil's Restaurant 126 if, as shown in FIG. 1, Phil's Restaurant 126 is closer to the user 102 than Yoga Gym 122.

In some embodiments, the POI recommender application 146 may generate a recommended unvisited POI for the user 102 comparatively. For example, the POI recommender application 146 may recommend the unvisited POI with the highest predicted user preference score for the user 102. As another example, the POI recommender application 146 may recommend an unvisited POI with a higher predicted user preference score for a particular category than the visited POIs in that category. For instance, if the user 102 has never visited Organic Supermarket 112, but the predicted user preference score for Organic Supermarket 112 is higher than the user's user preference score for visited supermarket POIs, such as Main Street Supermarket 110 or Harvest Supermarket 124, the POI recommender application 146 may generate a recommendation for the user 102 to visit Organic Supermarket 112. Of course, other ways for the user preference score predictor 144 to predict user preference scores may be envisioned in additional or alternative embodiments. Moreover, in some embodiments, the applications stored on the memory 136 may include a user interface application 148 configured to receive user input and display notifications and recommendations, such as, e.g., recommendations generated by the POI recommender application 146, via the user interface 132.

The various software applications 140-148 may be executed on the same processor 134 or on different processors 134. Moreover, it will be understood that there may be any number of software applications 140-148. Further, two or more of the various applications 140-148 may be integrated as a combined application, if desired.

Figure 2:
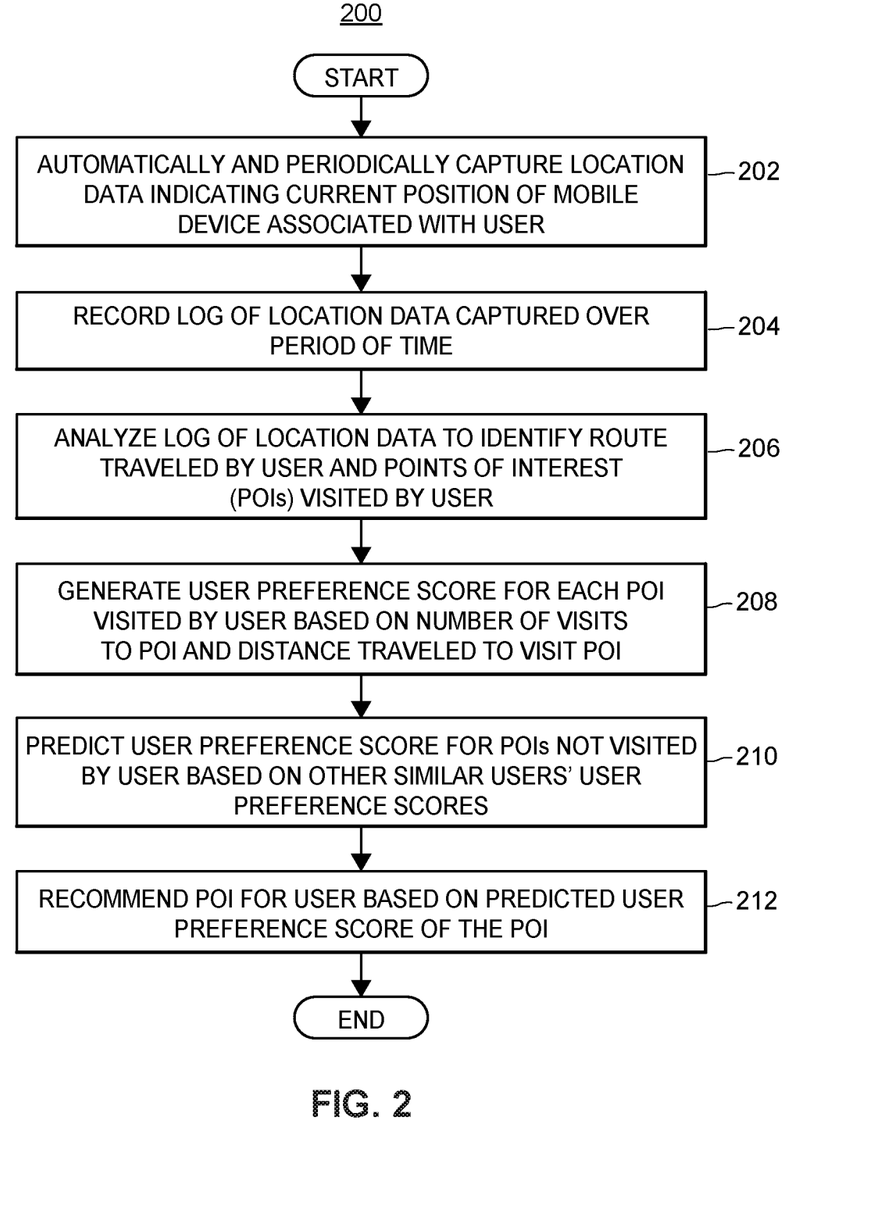
FIG. 2 depicts a flow diagram of an exemplary method associated with technology for recommending POIs to a mobile device user.

FIG. 2 depicts an flow diagram of an exemplary method 200 associated with technology for recommending points of interest (POIs) to a mobile device user (e.g., user 102). POIs may include various businesses, such as, e.g., supermarkets, cafes, restaurants, gyms, etc., as shown in FIG. 1. POIs may also include other locations a user may visit, such as, e.g., parks, museums, monuments, etc. In some embodiments, the POIs may also include events, such as, e.g., concerts, festivals, sporting events, conferences, plays, musicals, etc. The method 200 may be facilitated by an electronic device, such as, e.g., mobile device 104. The electronic device may support execution of a dedicated application that may facilitate the functionalities of the method 200. Further, the electronic device may enable the user to make various selections and facilitate various functionalities.

At block 202, location data indicating the current position of the mobile device associated with the user may be automatically and periodically captured, e.g., by a GPS unit (such as GPS unit 130) of the mobile device. For instance, the location data may be captured every ten seconds, every minute, every five minutes, etc. At block 204, a log of the location data captured over a period of time may be recorded, e.g., in a location data log stored on the memory of the mobile device (such as location data log 138 stored on memory 136). The log may include a position (e.g., GPS coordinates) and a time stamp for each capture of location data.

At block 206, the log of location data may be analyzed (e.g., by location data analyzer 140) to identify a route (e.g., route 106) traveled by the user and a plurality of POIs (e.g., POIs 108-126) visited by the user. For instance, the route may be identified by mapping each position and associated time stamp recorded in the log. In particular, a route may be a round trip from a base location (e.g., a location of home, school, work, etc. associated with the user, such as home base location 128), where a user travels from the base location to one or more POIs and then returns to the base location. In some embodiments, multiple routes may be identified by analyzing the log of the location data log. Where multiple routes are identified, frequently traveled routes (e.g., routes traveled daily, weekly, monthly, etc.) may additionally be identified from among the multiple routes.

In some instances, the plurality of POIs visited by the user may be identified by analyzing the log of the location data to determine stops along the route traveled by the user. For instance, if the mobile device position as indicated by the location data remains the same for a certain period of time (e.g., ten minutes, twenty minutes, an hour, etc.), the user may have stopped along the route. In embodiments, stops may be identified by accessing a POI database (e.g., POI database 150) including locations (e.g., GPS coordinates) of various POIs. In particular, POI locations from the database may be compared against identified mobile device stops to determine POIs corresponding to the stops.

At block 208, a user preference score may be generated for each POI visited by the user (e.g., by user preference score generator 142), based at least on the number of visits to the POI by the user and the distance traveled by the user to visit the POI. For instance, a greater number of visits by a user to a particular POI may correspond to a higher user preference score for that POI. As another example, a higher frequency of visits by the user to a particular POI may also correspond to a higher user preference score for that POI. Additionally, a greater distance traveled by the user to visit a particular POI may correspond to a higher user preference score for that POI.

In some embodiments, the distance traveled by the user to visit the POI (as factored into the generation of the user preference score) may be, for instance, the distance between the POI and the previous POI visited by the user. For instance, referring to FIG. 1, if a user first visited Organic Supermarket 112 and second visited Sunrise Coffee 116, the distance traveled by the user to visit Sunrise Coffee 116 would be the distance between Organic Supermarket 112 and Sunrise Coffee 116 along the route 106. As another example, the distance traveled by the user to visit the POI may be the distance between a home base location, workplace location, or school location (e.g., home base location 128) and that POI. In such instances, the distance traveled by the user to visit Sunrise Coffee 116 would be the distance between home base location 128 and Sunrise Coffee 116 along the route 106. Of course, in some embodiments, both the distance between the POI and the previous POI and the distance between the POI and the home base location may be factored into the generation of the user preference score.

At block 210, a user preference score may be predicted (e.g., by user preference score predictor 144) for POIs not visited by the user, based at least on user preference scores for those POIs associated with other similar users. The other similar users may be, for instance, other users who have visited one or more of the plurality of POIs visited by the user. For example, referring to FIG. 1, if the user visits Yoga Gym 122 and Phil's Restaurant 126, other similar users may be other users who have also visited Yoga Gym 122 and Phil's Restaurant 126. In particular, other similar users may be other users who have high user preference scores for one or more POIs for which the user has a high user preference score. A high user preference score may be, e.g., a user preference score above a certain threshold user preference score. For instance, referring to FIG. 1, if the user has a high user preference score for Main Street Supermarket 110 and Joe's Gym 114, other similar users may be other users with high user preference scores for one or both of Main Street Supermarket 110 and/or Joe's Gym 114. Of course, in other instances, the similarity of other users may be determined in additional or alternative ways, e.g., based on user input, or based on statistical clustering of users.

In particular, the user preference scores for POIs not visited by the user may be predicted based on the other similar users' user preference scores for the POIs. The other similar users' user preference scores may be accessed from a user preference score database (e.g., user preference score database 152), which may include user profiles indicating each of the other users' user preference scores for each POI visited. For example, if the user has not visited French Café 118 but other similar users have visited French Café 118, the similar user or similar users' user preference scores may be used to generate a predicted user preference score for French Café 118 for the user. In some instances, for example, the other similar users' user preference scores for a POI unvisited by the user may be averaged to predict a user preference score for the POI. As another example, the predicted user preference score for the POI may be based on weighting the other similar users' user preference scores for the POI based on how similar each of the other users is to the user (e.g., based on how many visited POIs the other similar user has in common with the user, based on how many similar high scores for visited POIs the other similar user has in common with the user, etc.).

In some embodiments, the prediction of the user preference score for a POI not visited by the user may be based additionally on actions of the user indicating a lack of preference for the POI. For example, a lower user preference score may be predicted for a POI not visited by the user when the POI is proximate to the route traveled by the user and also similar to one or more POIs traveled by the user. That is, if a user travels past a POI along a route but visits another similar POI instead, this may indicate a lack of preference for the unvisited POI. For instance, referring to FIG. 1, if the user 102 frequently travels along route 106 from home base 128, passes Main Street Supermarket 110, and visits Organic Supermarket 112 or Harvest Supermarket 124, this may indicate that, in the category of Supermarkets, the user does not prefer Main Street Supermarket 110. That is, the fact that the user frequently travels past a POI in a particular POI category to visit other POIs in the same category may in some instances indicate that the user does not want to visit that POI. In such instances, the predicted user preference score for that POI may be lower. Of course, other additional or alternative methods for predicting the user preference score for the unvisited POI may be envisioned.

At block 212, a POI may be recommended for a user (e.g., by the POI recommender 146) based at least on the predicted user preference score for the POI. The recommendation may be displayed to the user by the mobile device, e.g., via a user interface (such as, e.g., user interface 132) supported by a user interface application (such as, e.g., user interface application 148). In particular, unvisited POIs with high predicted user preference scores (e.g., user preference scores above a certain threshold user preference score) may be recommended for the user. The recommended POI may additionally be based on the proximity of the POI to one or more routes traveled by the user. For example, among several unvisited POIs with high predicted user preference scores, the closest POI or POIs to one or more routes traveled by the user may be recommended to the user. In some instances, where several routes have been identified for the user, more frequently traveled routes may be weighted more heavily or otherwise prioritized in recommending a POI for the user— e.g., POIs closer to more frequently traveled routes may be more likely to be recommended. Additionally or alternatively, the recommended POI may be based on the proximity of the POI to an updated current position of the mobile device (i.e., by proxy, the current location of the user). For example, among several unvisited POIs with high predicted user preference scores, the closest POI or POIs to the current location of the user may be selected for recommendation to the user.

Further additionally or alternatively, the recommended POI may be based on the POI category. For instance, for a user who frequently visits restaurants, a restaurant POI with a high predicted user preference score near a user route or near the current location of the user may be more likely to be recommended. As another example, for a user who rarely visits gyms, a gym POI, even with a high predicted user preference score, may be less likely to be recommended to the user.

In some instances, an indication may be recorded when a user subsequently visits a particular POI after it is recommended for the user. The indication may in some instances be factored into the recommendation process, e.g., as a check for whether a recommendation is successful.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart home functionality (or home occupant preferences or preference profiles), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method in a mobile device, comprising:
    automatically and periodically capturing location data indicating a current position of the mobile device, wherein the mobile device is associated with a user;
    recording a log of the location data captured over a period of time;
    analyzing the log of the location data to identify:
        (i) a route traveled by the user, and
        (ii) a plurality of points of interest (POIs) visited by the user;
    generating a user preference score for each POI visited by the user, the user preference score being based at least on:
        (i) a number of visits by the user to each POI, and
        (ii) a distance traveled by the user to visit each POI, wherein a greater distance traveled by the user to visit a POI corresponds to a higher user preference score for the POI;
    identifying, using a user preference score database, other similar users by determining (i) which other users have visited one or more of the plurality of POIs visited by the user and/or (ii) which other users have similar user preference scores for one or more of the plurality of POIs visited by the user;
    predicting a user preference score for each POI not visited by the user, the predicted user preference score being based at least on one or more other user preference scores generated for the POI not visited by the user, the one or more other user preference scores associated with the other similar users; and
    recommending a POI for the user based at least on the predicted user preference score of the POI.

2. The computer-implemented method of claim 1, wherein a greater number of visits by the user to a POI corresponds to a higher user preference score for the POI.

3. The computer-implemented method of claim 1, wherein the distance traveled by the user to visit the POI is a distance between the POI and a previous POI visited by the user.

4. The computer-implemented method of claim 1, wherein predicting a user preference score for each POI not visited by the user further comprises predicting a lower user preference score for a POI not visited by the user when the POI is proximate to the route traveled by the user and similar to one or more POIs visited by the user.

5. The computer-implemented method of claim 1, wherein recommending the POI for the user is further based on a proximity of the POI to the route traveled by the user of the mobile device.

6. The computer-implemented method of claim 1, wherein recommending the POI for the user is further based on a proximity of the POI to an updated current position of the mobile device.

7. The computer-implemented method of claim 1, further comprising recording an indication when, after recommending a POI for the user, the user subsequently visits the POI.

8. An electronic device, comprising:
a memory configured to store non-transitory computer executable instructions; and
a processor configured to interface with the memory, and configured to execute the non-transitory computer executable instructions to cause the processor to:
automatically and periodically capture location data indicating a current position of the electronic device, the electronic device being associated with a user;
record a log of the location data captured over a period of time;
analyze the log of the location data to identify:
(i) a route traveled by the user, and
(ii) a plurality of points of interest (POIs) visited by the user;
generate a user preference score for each POI visited by the user, the user preference score being based at least on:
(i) a number of visits by the user to each POI, and
(ii) a distance traveled by the user to visit each POI, wherein a greater distance traveled by the user to visit a POI corresponds to a higher user preference score for the POI;
identifying, using a user preference score database, other similar users by determining (i) which other users have visited one or more of the plurality of POIs visited by the user and/or (ii) which other users have similar user preference scores for one or more of the plurality of POIs visited by the user;
predict a user preference score for each POI not visited by the user, the predicted user preference score being based at least on one or more other user preference scores generated for the POI not visited by the user, the one or more other user preference scores associated with the other similar users; and
recommend a POI for the user based at least on the predicted user preference score of the POI.

9. The electronic device of claim 8, wherein a greater number of visits by the user to a POI corresponds to a higher user preference score for the POI.

10. The electronic device of claim 8, wherein the distance traveled by the user to visit the POI is a distance between the POI and a previous POI visited by the user.

11. The electronic device of claim 8, wherein the computer executable instructions causing the processor to predict a user preference score for each POI not visited by the user further include instructions causing the processor to predict a lower user preference score for a POI not visited by the user when the POI is proximate to the route traveled by the user and similar to one or more POIs visited by the user.

12. The electronic device of claim 8, wherein the computer executable instructions causing the processor to recommend the POI for the user further include instructions causing the processor to recommend the POI for the user based on a proximity of the POI to the route traveled by the user of the mobile device.

13. The electronic device of claim 8, wherein the computer executable instructions causing the processor to recommend the POI for the user further include instructions causing the processor to recommend the POI for the user based on a proximity of the POI to an updated current position of the mobile device.

14. The electronic device of claim 8, wherein the computer executable instructions further include instructions causing the processor to record an indication when, after recommending a POI for the user, the user subsequently visits the POI.

* * * * *